(12) United States Patent
Kozono et al.

(10) Patent No.: US 12,545,250 B2
(45) Date of Patent: Feb. 10, 2026

(54) DRIVING ASSISTANCE APPARATUS, DRIVING ASSISTANCE METHOD, AND NON-TRANSITORY RECORDING MEDIUM

(71) Applicant: SUBARU CORPORATION, Tokyo (JP)

(72) Inventors: Kazuya Kozono, Tokyo (JP); Takamichi Kirihara, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 200 days.

(21) Appl. No.: 18/467,039

(22) Filed: Sep. 14, 2023

(65) Prior Publication Data

US 2024/0123984 A1   Apr. 18, 2024

(30) Foreign Application Priority Data

Oct. 12, 2022   (JP) ................. 2022-164088

(51) Int. Cl.
*B60W 30/095* (2012.01)

(52) U.S. Cl.
CPC ..... *B60W 30/0956* (2013.01); *B60W 2520/14* (2013.01); *B60W 2554/801* (2020.02); *B60W 2554/802* (2020.02)

(58) Field of Classification Search
CPC . B60W 30/09; B60W 30/095; B60W 30/0956
See application file for complete search history.

(56) References Cited

U.S. PATENT DOCUMENTS

| | | | | |
|---|---|---|---|---|
| 2010/0292887 | A1* | 11/2010 | Becker | B60R 21/0132 701/31.4 |
| 2012/0078569 | A1* | 3/2012 | Doerr | B60R 21/0132 702/141 |
| 2015/0227800 | A1* | 8/2015 | Takemae | G06V 20/588 382/104 |
| 2016/0207534 | A1* | 7/2016 | Nishimura | B60W 30/18145 |
| 2018/0174464 | A1* | 6/2018 | Ikedo | G08G 1/166 |
| 2018/0178721 | A1* | 6/2018 | Ikedo | B60R 16/0231 |
| 2018/0281814 | A1* | 10/2018 | Murray | B60W 30/12 |
| 2021/0370924 | A1* | 12/2021 | Kuno | B60W 30/0956 |
| 2022/0144255 | A1* | 5/2022 | Seong | B60W 30/09 |

FOREIGN PATENT DOCUMENTS

JP    2021-187207 A    12/2021

* cited by examiner

*Primary Examiner* — Anshul Sood
(74) *Attorney, Agent, or Firm* — Rimon P.C.

(57) ABSTRACT

A driving assistance apparatus includes an electronic control unit. The electronic control unit: calculates a yaw rate change rate of a first vehicle to which the driving assistance apparatus is to be applied, based on a yaw rate of the first vehicle obtained at multiple time points; calculates a predicted path of a second vehicle; calculates a predicted path of the first vehicle assuming that the yaw rate change rate is kept constant; calculates a provisional contact point, based on an intersection point of the predicted path of the first vehicle and the predicted path of the second vehicle; calculates a provisional contact time when the first vehicle reaches the provisional contact point; and determines whether the first vehicle and the second vehicle come into contact with each other, assuming that the first vehicle and the second vehicle at the provisional contact time travel straight to cross each other.

12 Claims, 15 Drawing Sheets

DRIVING ASSISTANCE APPARATUS, DRIVING ASSISTANCE METHOD, AND NON-TRANSITORY RECORDING MEDIUM

CROSS-REFERENCE TO RELATED APPLICATIONS

The present application claims priority from Japanese Patent Application No. 2022-164088 filed on Oct. 12, 2022, the entire contents of which are hereby incorporated by reference.

BACKGROUND

The disclosure relates to a driving assistance apparatus, a driving assistance method, and a non-transitory recording medium that determine whether contact of a vehicle occurs.

A known technique predicts a contact position between an own vehicle and another vehicle (a target vehicle), and performs driving assistance. Japanese Unexamined Patent Application Publication (JP-A) No. 2021-187207 discloses a driving assistance apparatus that assumes that an own vehicle travels straight while keeping a current speed, and that a target vehicle keeps a current speed. The driving assistance apparatus identifies the target vehicle as a crossing target, when the own vehicle and the target vehicle are predicted to come into contact with each other in a crossing region where a region through which the target vehicle is predicted to pass and a region through which the own vehicle passes overlap with each other. The driving assistance apparatus controls a braking device of the own vehicle to cause the own vehicle to decelerate at a deceleration rate from a time before a predicted contact time when the own vehicle and the crossing target are predicted to come into contact with each other.

SUMMARY

An aspect of the disclosure provides a driving assistance apparatus including an electronic control unit. The electronic control unit is configured to: calculate a yaw rate change rate of a first vehicle to which the driving assistance apparatus is to be applied, based on a yaw rate of the first vehicle obtained at multiple time points; calculate a predicted path of a second vehicle; calculate a predicted path of the first vehicle assuming that the yaw rate change rate is kept constant; calculate a provisional contact point, based on an intersection point of the predicted path of the first vehicle and the predicted path of the second vehicle; calculate a provisional contact time when the first vehicle reaches the provisional contact point; and determine whether the first vehicle and the second vehicle come into contact with each other, assuming that the first vehicle and the second vehicle at the provisional contact time travel straight to cross each other.

An aspect of the disclosure provides a driving assistance method including: calculating a yaw rate change rate of a first vehicle to which the driving assistance method is to be applied, based on a yaw rate of the first vehicle obtained at multiple time points; calculating a predicted path of a second vehicle; calculating a predicted path of the first vehicle assuming that the yaw rate change rate is kept constant; calculating a provisional contact point, based on an intersection point of the predicted path of the first vehicle and the predicted path of the second vehicle; calculating a provisional contact time when the first vehicle reaches the provisional contact point; and determining whether the first vehicle and the second vehicle come into contact with each other, assuming that the first vehicle and the second vehicle at the provisional contact time travel straight to cross each other.

An aspect of the disclosure provides a non-transitory computer readable recording medium containing a program. The program causes, when executed by a computer, the computer to implement a method. The method includes: calculating a yaw rate change rate of a first vehicle to which the method is to be applied, based on a yaw rate of the first vehicle obtained at multiple time points; calculating a predicted path of a second vehicle; calculating a predicted path of the first vehicle assuming that the yaw rate change rate is kept constant; calculating a provisional contact point, based on an intersection point of the predicted path of the first vehicle and the predicted path of the second vehicle; calculating a provisional contact time when the first vehicle reaches the provisional contact point; and determining whether the first vehicle and the second vehicle come into contact with each other, assuming that the first vehicle and the second vehicle at the provisional contact time travel straight to cross each other.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
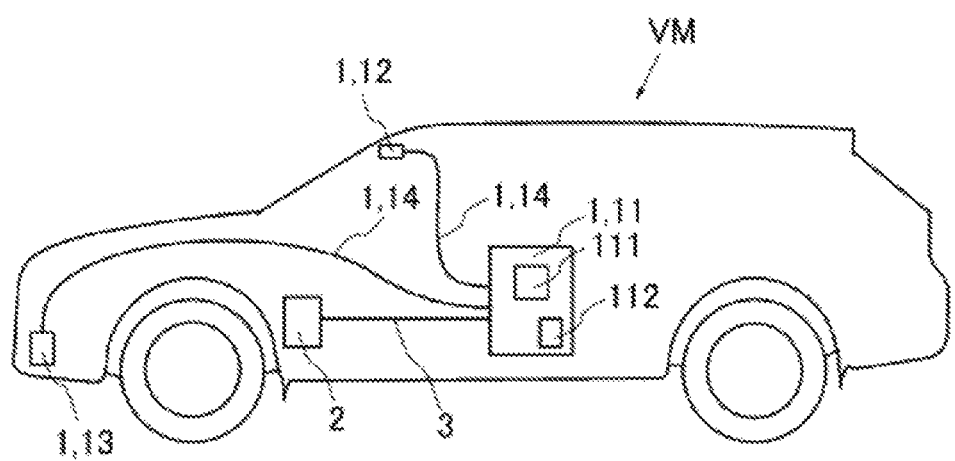
FIG. 1 is a diagram illustrating a driving assistance apparatus to be mounted on a vehicle.

A contact determination apparatus in JP-A No. 2021-187207 is effective when an own vehicle is traveling straight. However, it is difficult for contact determination to operate when the own vehicle is traveling while turning at, for example, a curve or an intersection.

It is desirable to provide a driving assistance apparatus and a driving assistance method that make it possible to perform contact determination when an own vehicle is traveling while turning, and a non-transitory recording medium containing a program that makes it possible to execute such a driving assistance method.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a vehicle mounted with a driving assistance apparatus 1 according to an example embodiment of the disclosure. The vehicle in FIG. 1 may be referred to as a vehicle VM. The vehicle VM may thus be distinguished from a vehicle (a target vehicle VS) as a target with which whether the vehicle VM comes into contact is to be determined. The vehicle VM may serve as an own vehicle. The driving assistance apparatus 1 of the vehicle VM may include an electronic control unit (ECU) 11, cameras 12, radar sensors 13, and a wiring line 14. The wiring line 14 may couple the ECU 11 to the cameras 12 and the radar sensors 13. The ECU 11 may include a central processing unit (CPU) 111 and a memory 112. Two cameras 12 may be arranged in a left-right direction in the vehicle VM. One radar sensor 13 may be disposed on each of the left and the right at the front of the vehicle VM. In addition, the ECU 11 may be coupled to a braking device 2 of the vehicle VM via a communication line 3. In one embodiment, the vehicle VM may serve as a "first vehicle". In one embodiment, the target vehicle VS may serve as a "second vehicle".

Images captured by the two cameras 12 and data detected by the two radar sensors 13 may be sent to the ECU 11 via the wiring line 14, and analyzed by the CPU 111 using software held in the memory 112. The CPU 111 and the memory 112 may configure a computer. When the ECU 11 determines that an action is to be taken in response to contact, the ECU 11 may take an action such as transmitting a braking command to the braking device 2 via the communication line 3.

Figure 2:
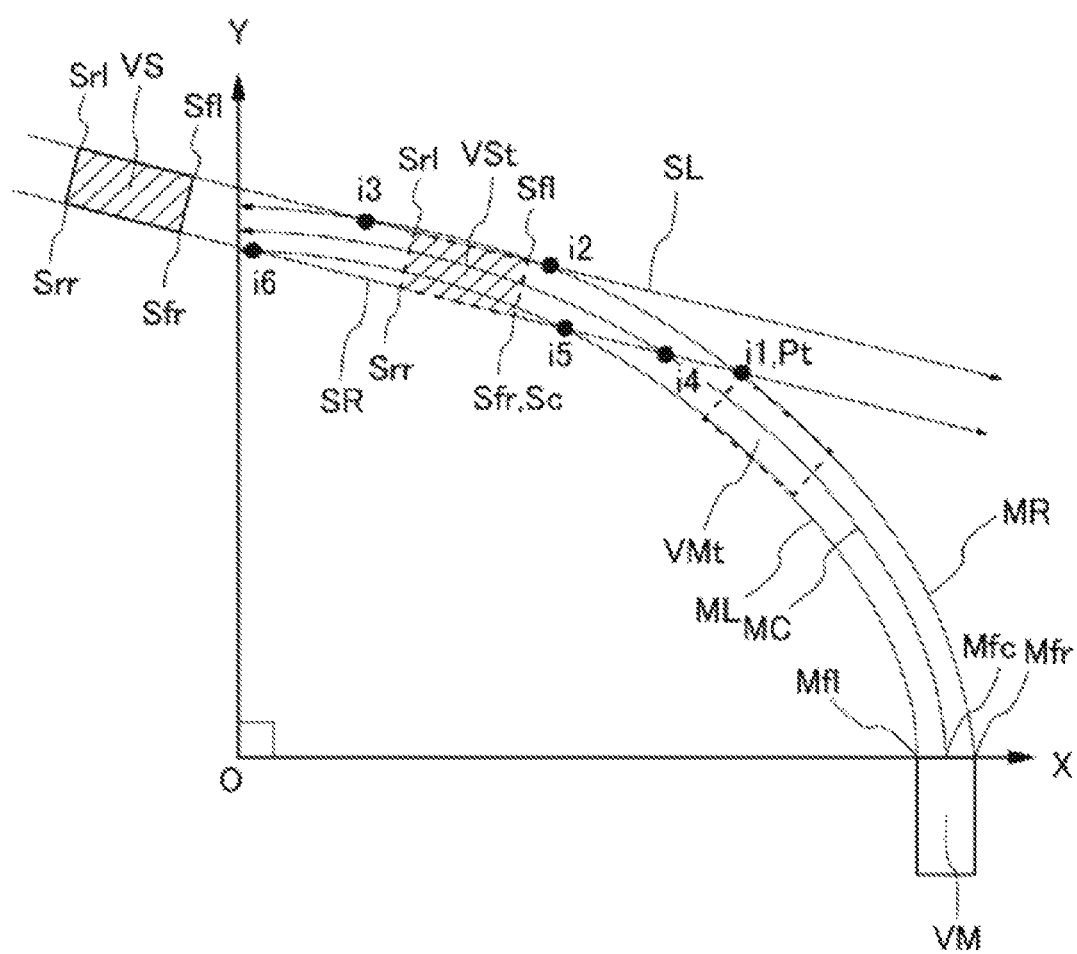
FIG. 2 is a diagram illustrating predicted paths of the vehicle and a target vehicle.

FIG. 2 illustrates predicted paths of the vehicle VM and the target vehicle VS to be used to determine contact. FIG. 2 is a top view of the vehicle VM and the target vehicle VS and the predicted paths. The vehicle VM and the target vehicle VS indicated by solid lines may be positions at a prediction reference time Ts. An XY coordinate system in FIG. 2 may be set in such a manner that, at a current position of the vehicle VM at the prediction reference time Ts, a Y coordinate of a front middle Mfc is 0 (zero), and an X coordinate of the front middle Mfc is 0 (zero) when the vehicle VM turns by a predetermined angle of 90° from the prediction reference time Ts. At the current position of the vehicle VM at the prediction reference time Ts, the vehicle VM may face a +Y direction. In addition, the vehicle VM that has turned by 90° may face a −X direction in a case of a left turn as in FIG. 2. The vehicle VM may face a +X direction in a case of a right turn.

Curves in FIG. 2 indicate predicted paths of respective parts of the vehicle VM. An own vehicle right predicted path MR, an own vehicle middle predicted path MC, and an own vehicle left predicted path ML may respectively be predicted paths of a front right end Mfr, the front middle Mfc, and a front left end Mfl of the vehicle VM. A target vehicle right predicted path SR and a target vehicle left predicted path SL may respectively be predicted paths of a front right end Sfr and a front left end Sfl of the target vehicle VS. In example embodiments of the disclosure, the vehicle VM may be predicted to turn at a constant yaw rate change rate Yrc and travel along a clothoid curve. The own vehicle middle predicted path MC may be a clothoid curve. In addition, the own vehicle right predicted path MR and the own vehicle left predicted path ML may be obtained from a vehicle width of the vehicle VM and the own vehicle middle predicted path MC. In FIG. 2, a vehicle VMt and a target vehicle VSt indicated by dotted lines may be positions of the vehicle VM and the target vehicle VS at a provisional contact time Tt to be described later.

In FIG. 2, the curves extending from the middle and opposite sides at the front of the vehicle VM indicate own vehicle predicted paths that are the predicted paths of the respective parts of the vehicle VM. The own vehicle right predicted path MR may be the own vehicle predicted path of the front right end Mfr of the vehicle VM, i.e., an own vehicle predicted path on the right side. The own vehicle middle predicted path MC may be the own vehicle predicted path of the front middle Mfc of the vehicle VM, i.e., an own vehicle predicted path in the middle. The own vehicle left predicted path ML may be the own vehicle predicted path of the front left end Mfl, of the vehicle VM, i.e., an own vehicle predicted path on the left side.

Next, with reference to flowcharts of FIGS. 3 to 5 and 10, description is given of a control executed until a contact response operation is performed based on driving assistance. Steps of the flowcharts may indicate a driving assistance process and a driving assistance method. This control may be executed by the ECU 11 by the CPU 111 performing processing in accordance with a program held in the memory 112. This program may be held in a non-transitory computer readable recording medium.

Figure 3:
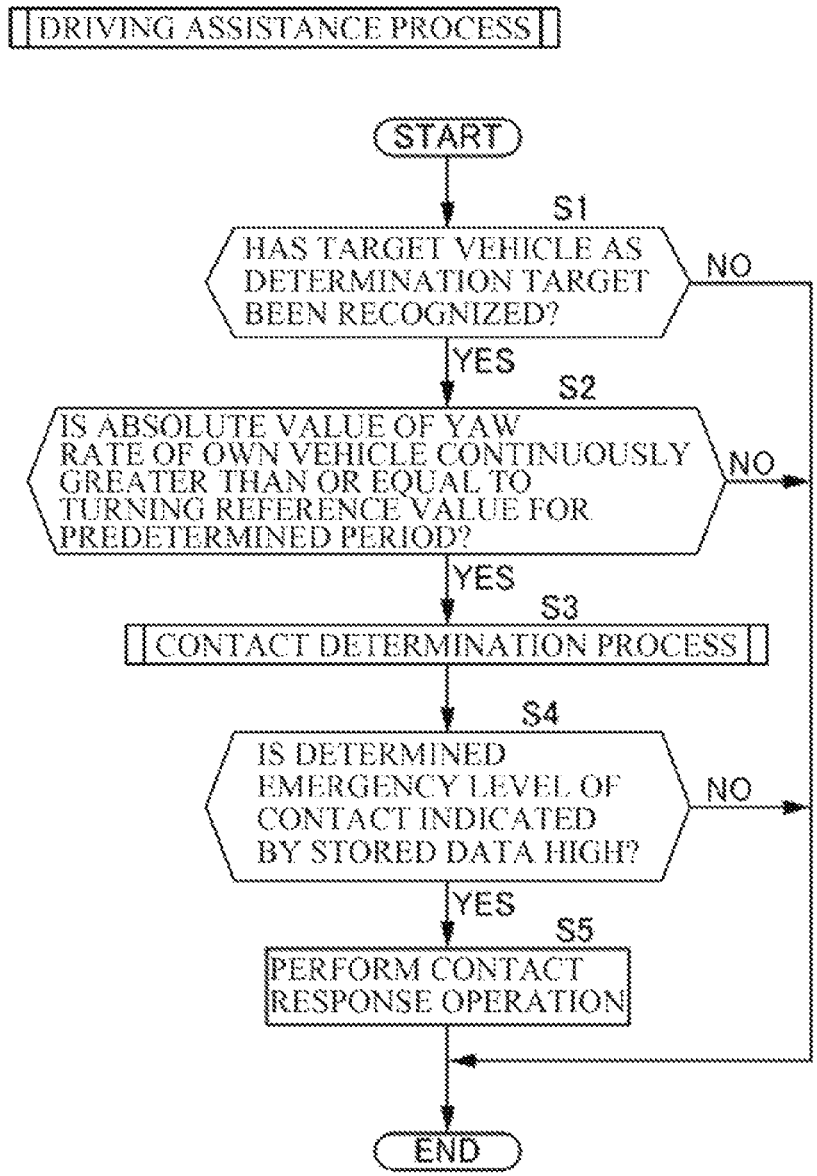
FIG. 3 is a flowchart illustrating a driving assistance process.

The driving assistance process illustrated in FIG. 3 may be started and repeatedly executed at predetermined time intervals. First, in steps S1 and S2, the ECU 11 may determine whether to start the contact determination process in step S3 and subsequent processes. In step S1, the ECU 11 may determine whether the target vehicle VS as a determination target has been recognized. The ECU 11 may analyze the images captured by the two cameras 12 and the data detected by the two radar sensors 13, and determine whether the target vehicle VS as a target of contact determination has been recognized. If the ECU 11 determines that the target vehicle VS has been recognized (YES in step S1), the ECU 11 may cause the flow to proceed to step S2. If the ECU 11 does not determine that the target vehicle VS has been recognized (NO in step S1), the ECU 11 may end the process, and wait for a start time of the next driving assistance process.

In the vehicle VM, a yaw rate Yr may be calculated based on a speed, a lateral acceleration rate, and a steering wheel rotation angle detected from various sensors. In step S2, if an absolute value of the yaw rate Yr is continuously greater than or equal to a turning reference value for a predetermined period (YES in step S2), the ECU 11 may cause the flow to proceed to step S3, and perform a contact determination process at the time of turning. Otherwise (NO in step S2), the ECU 11 may end the process, and wait for the start time of the next driving assistance process.

Figure 4:
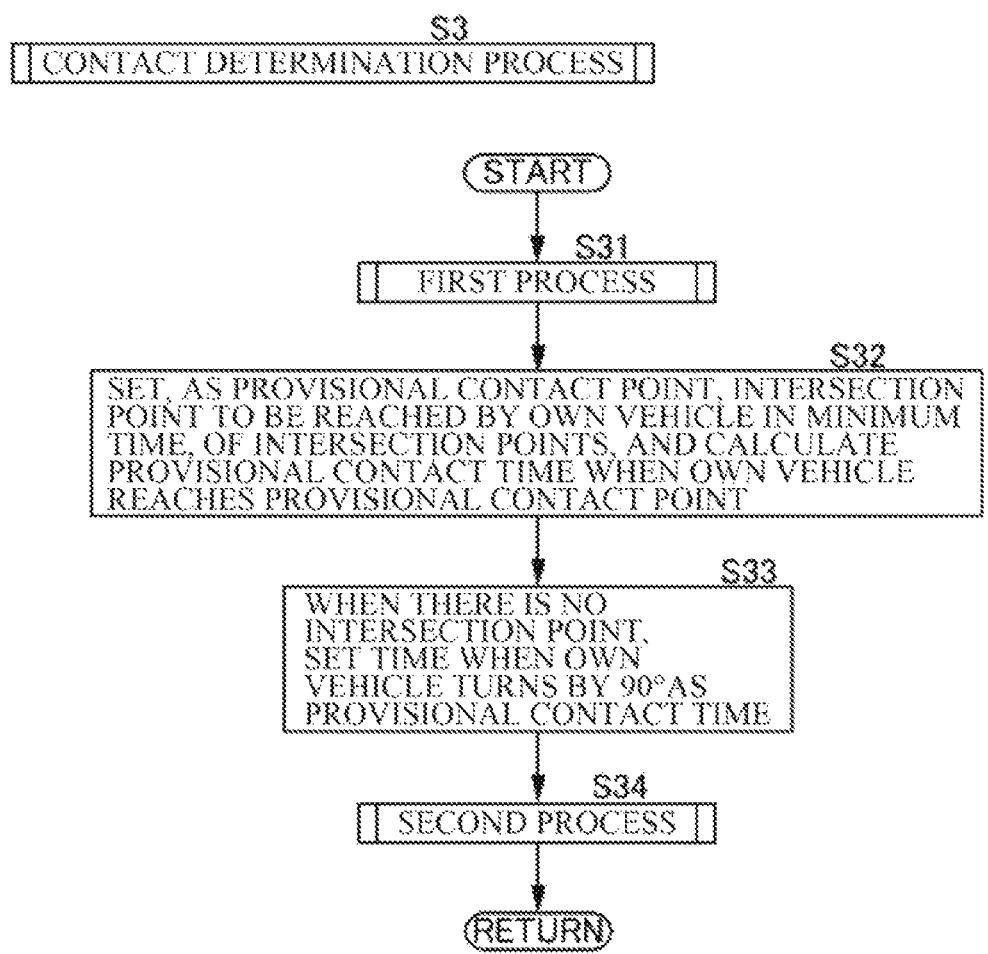
FIG. 4 is a flowchart illustrating a contact determination process.

FIG. 4 illustrates a subroutine of the contact determination process in step S3. In the contact determination process, the ECU 11 may perform a first process in step S31 and processes of steps S32 and S33, and thereafter perform a second process in step S34 and return to a main routine in FIG. 3.

In the first process in step S31, the ECU 11 may calculate the own vehicle predicted path and the target vehicle predicted path, assuming that the vehicle VM travels along the own vehicle predicted path indicated by a clothoid curve and the target vehicle VS travels in a uniform linear motion. Thereafter, the ECU 11 may calculate an intersection point i of the own vehicle predicted path and the target vehicle predicted path. The intersection point i may serve as a candidate for the provisional contact point Pt to be described later. Multiple intersection points i are obtained in some cases, and there is no intersection point i in some cases. Note that the first process may be a process of calculating the intersection points i of curves and straight lines, giving no consideration to timing. In step S32, the ECU 11 may determine the provisional contact point Pt from among the candidate intersection points i, and calculate the provisional contact time Tt that is a time when the vehicle VM reaches the provisional contact point Pt. In step S33, when there are no candidate intersection points i from which the provisional contact point Pt is to be determined, the ECU 11 may determine, as the provisional contact time Tt, a time when the vehicle VM turns by 90° that is an upper limit angle of a prediction angle range. Thereafter, in the second process in step S34, the ECU 11 may perform contact determination assuming that the vehicle VMt and the target vehicle VSt at the provisional contact time Tt travel straight in uniform linear motions to cross each other.

Figure 5:
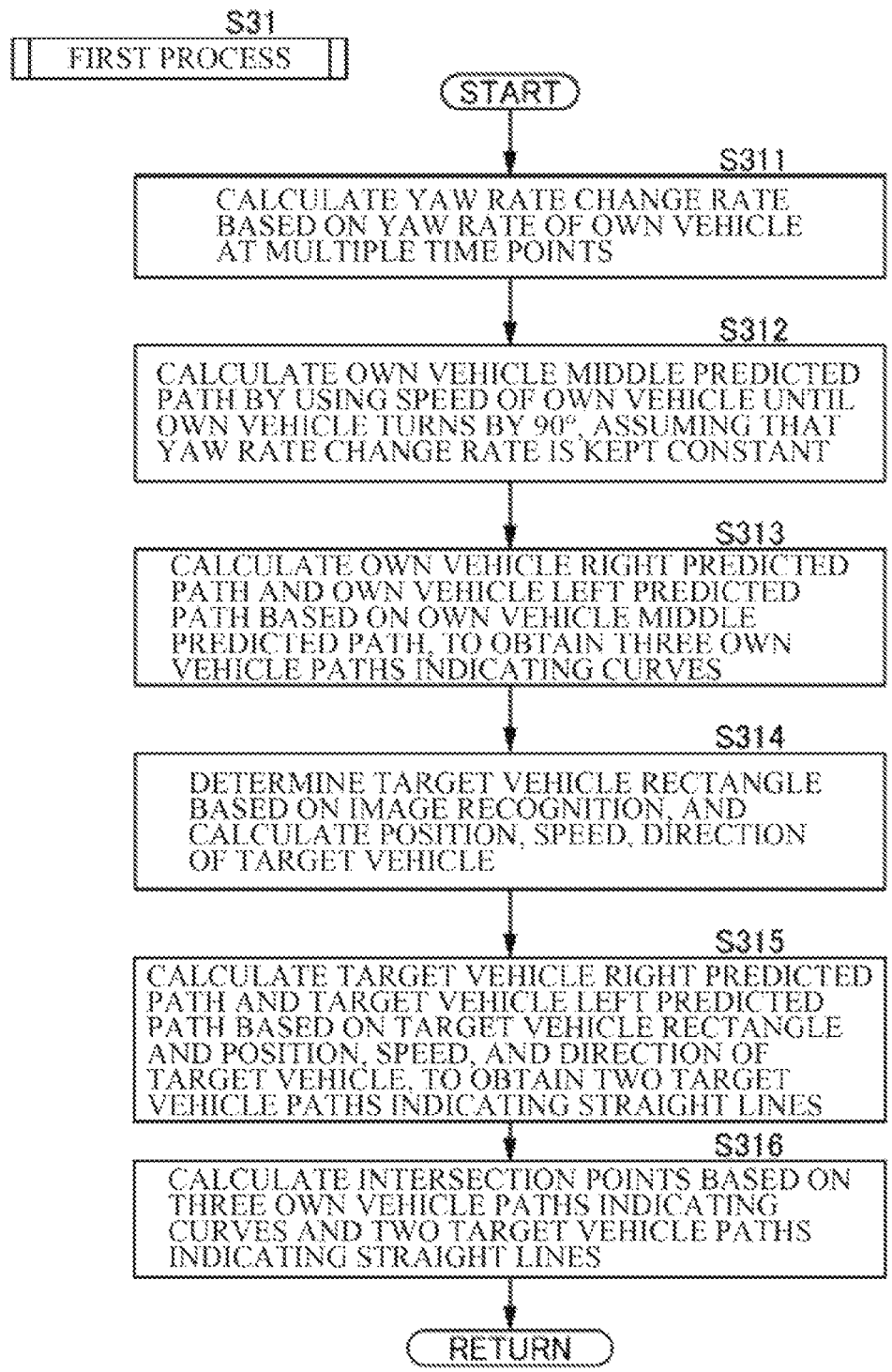
FIG. 5 is a flowchart illustrating a first process.
Figure 6:
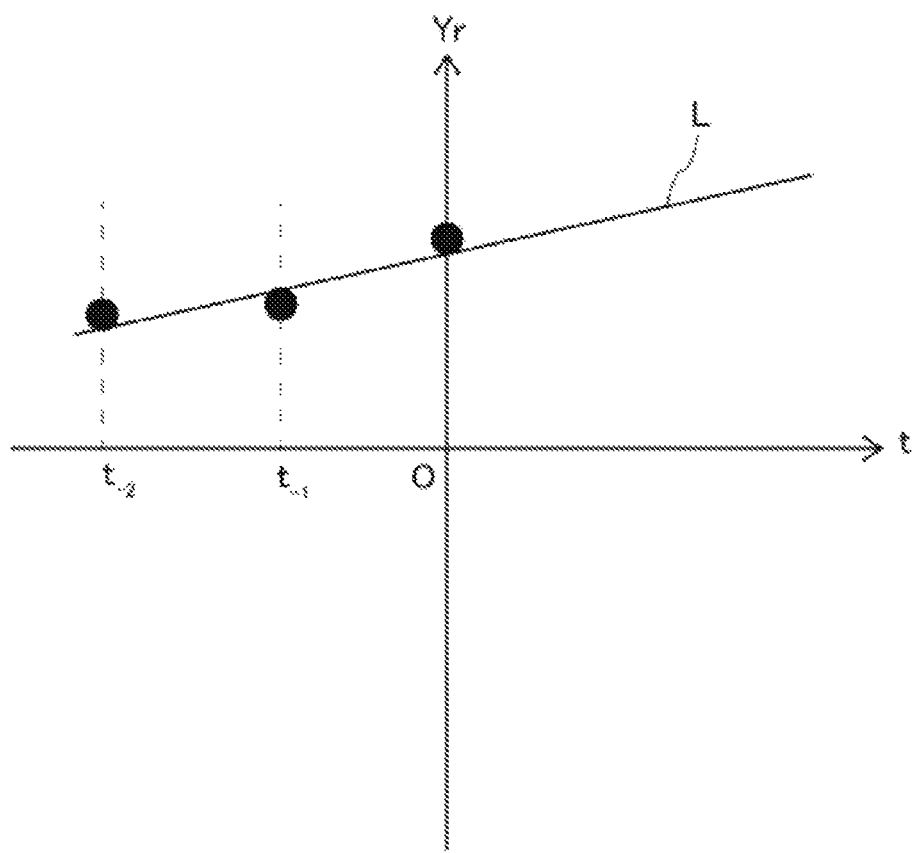
FIG. 6 is a diagram illustrating calculation of a yaw rate change rate.

First, with reference to FIG. 5, description is given of a subroutine of the first process in step S31 of calculating the intersection points i serving as the candidates for the provisional contact point Pt. In step S311, the ECU 11 may calculate the yaw rate change rate Yrc based on the yaw rate Yr of the vehicle VM at multiple time points. FIG. 6 is a graph illustrating the yaw rate Yr at each time point. The horizontal axis represents time, i.e., a time point t, and the vertical axis represents the yaw rate Yr. In the example embodiment, the ECU 11 may calculate an expression of a straight line L by a least squares method, based on the yaw rate Yr at three time points indicated by black circles in FIG. 6. The three time points may include past two time points ($t=t_{-2}$ and $t_{-1}$), and a current time ($t=0$) that is the prediction reference time Ts. A slope of the straight line L may be the yaw rate change rate Yrc.

As the yaw rate Yr, values at four or more time points may be used for calculation of the expression of the straight line L, or the yaw rate Yr at two time points may be coupled and used for calculation of the expression of the straight line L. When the straight line L is inclined, in other words, when the yaw rate change rate Yrc is a value other than 0 (zero), the predicted path may be a clothoid curve. By using the expression of the straight line L, it is possible for the ECU 11 to obtain the own vehicle middle predicted path MC as the predicted path of the vehicle VM, assuming that the yaw rate change rate Yrc is kept after the current time, i.e., the prediction reference time Ts>0).

In subsequent step S312, the ECU 11 may calculate a time when the vehicle VM turns by a setting angle of 90° with the yaw rate change rate Yrc kept, as a prediction end time Te. In the example embodiment, predictions may be made until the vehicle VM turns by 90°. The prediction angle range may be from 0° to 90° both inclusive in the example embodiments, but may be another angle range. By using speed data regarding the vehicle VM at the prediction reference time Ts, the ECU 11 may calculate the own vehicle middle predicted path MC, i.e., the predicted path of the front middle Mfc of the vehicle VM, until the prediction end time Te. As illustrated in FIG. 2, the own vehicle middle predicted path MC may be the predicted path until the front middle Mfc of the vehicle VM turns by 90° from the position at the prediction reference time Ts. Because the yaw rate change rate Yrc is constant, the own vehicle middle predicted path MC is a clothoid curve.

In step S313, the ECU 11 may calculate the own vehicle right predicted path MR and the own vehicle left predicted path ML, based on data regarding the vehicle width of the vehicle VM held in the memory 112 and the own vehicle middle predicted path MC, to obtain three own vehicle paths indicating curves. The own vehicle right predicted path MR may be calculated as the path of the position, at each time point, shifted by one-half the vehicle width to a right direction orthogonal to a traveling direction of the own vehicle middle predicted path MC. The own vehicle left predicted path ML may be calculated as the path of the position, at each time point, shifted by one-half the vehicle width to a left direction orthogonal to the traveling direction of the own vehicle middle predicted path MC. The ECU 11 may thus calculate the own vehicle right predicted path MR, the own vehicle middle predicted path MC, and the own vehicle left predicted path ML illustrated in FIG. 2.

In subsequent step S314, the ECU 11 may calculate the position of the target vehicle VS at multiple time points, and calculate a speed and a direction of the target vehicle VS based on the position at the multiple time points. In addition, the ECU 11 may recognize the images obtained from the cameras 12 by using also the data detected by the radar sensors 13, and determine a rectangle occupied by the target vehicle VS on a horizontal plane as a target vehicle rectangle. The target vehicle rectangle may differ in size and shape, depending on whether the target vehicle VS is recognized as a small-sized vehicle or as a large-sized vehicle in the images. The memory 112 may hold multiple target vehicle rectangles, and the target vehicle rectangle may be selected based on image recognition. Thus, the ECU 11 may determine the target vehicle VS as the target vehicle rectangle that is a rectangular frame on XY coordinates. As indicated by the target vehicle VS in FIG. 2, the target vehicle rectangle may be held as a rectangle coupling the front right end Sfr, the front left end Sfl, a rear left end Srl, and a rear right end Srr. In addition, a rectangle occupied by the vehicle VM on the horizontal plane, i.e., an own vehicle rectangle, may be held in the memory 112 as a setting value.

In subsequent step S315, the ECU 11 may calculate the target vehicle right predicted path SR and the target vehicle left predicted path SL illustrated in FIG. 2, based on the target vehicle rectangle and the position, the speed, and the direction of the target vehicle VS, to obtain two target vehicle paths indicating straight lines.

In step S316, the ECU 11 may calculate the intersection points of the own vehicle right predicted path MR, the own vehicle middle predicted path MC, and the own vehicle left predicted path ML, i.e., the three own vehicle paths indicating curves, and the target vehicle right predicted path SR and the target vehicle left predicted path SL, i.e., the two target vehicle paths indicating straight lines. In the case illustrated in FIG. 2, six intersection points i1 to i6 may be calculated.

Figure 7:
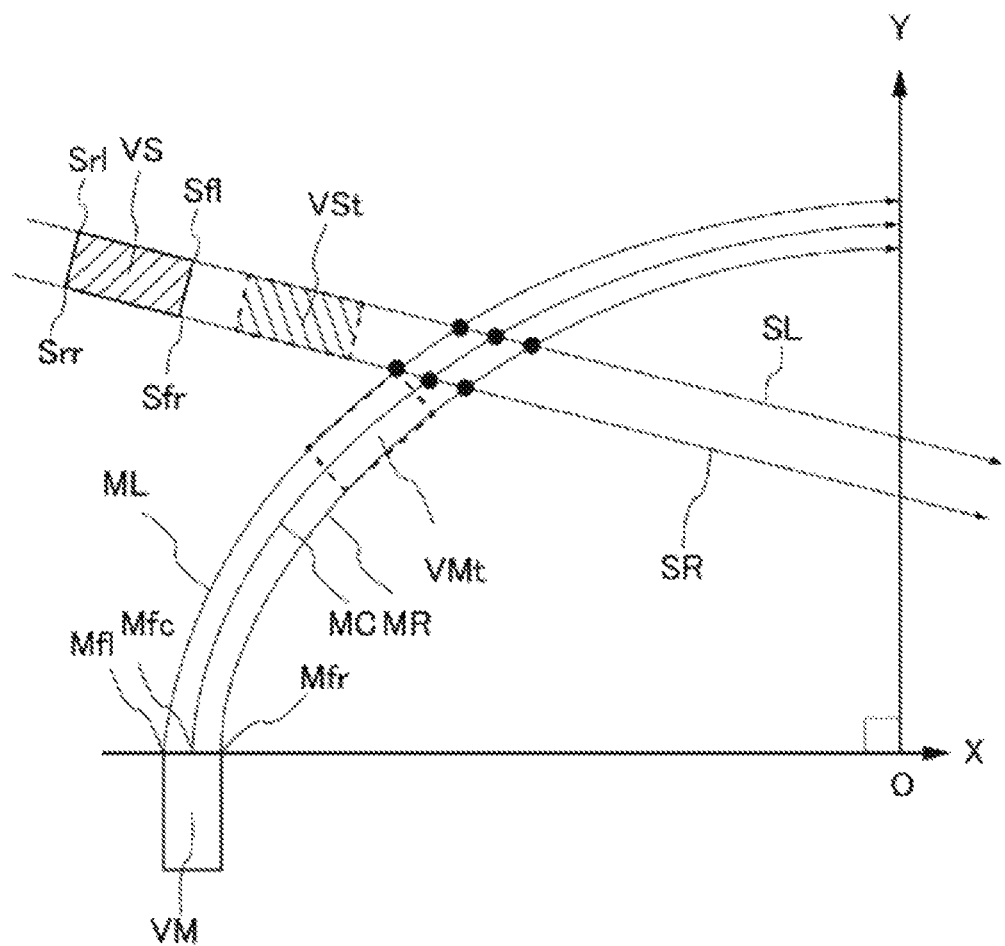
FIG. 7 is a diagram illustrating the predicted paths of the vehicle and the target vehicle when the vehicle makes a right turn.

When the vehicle VM makes a left turn, the own vehicle paths and the target vehicle paths may be as in FIG. 2. A case of a right turn is illustrated in FIG. 7. In the case of a right turn, the position at the prediction end time Te where the vehicle VM has turned by 90° may be on the right side with respect to the position of the vehicle VM at the prediction reference time Ts. Accordingly, the front middle Mfc, the own vehicle right predicted path MR, the own vehicle middle predicted path MC, and the own vehicle left predicted path ML may have negative X coordinates. The yaw rate Yr may also be a negative value.

When the first process ends, in step S32 illustrated in FIG. 4, the ECU 11 may set, as the provisional contact point Pt, the intersection point i to be reached by the vehicle VM in a minimum time, of the calculated intersection points i. The vehicle VM reaches the intersection point it in the minimum time, of the calculated intersection points i1 to i6 in FIG. 2. The intersection point it may thus serve as the provisional contact point Pt. In addition, the ECU 11 may calculate the provisional contact time Tt that is a time when the vehicle VM moves to be positioned at the vehicle VMt. In FIG. 2, the vehicle VM moves and reaches the provisional contact point Pt at the provisional contact time Tt to be the vehicle VMt.

Figure 8:
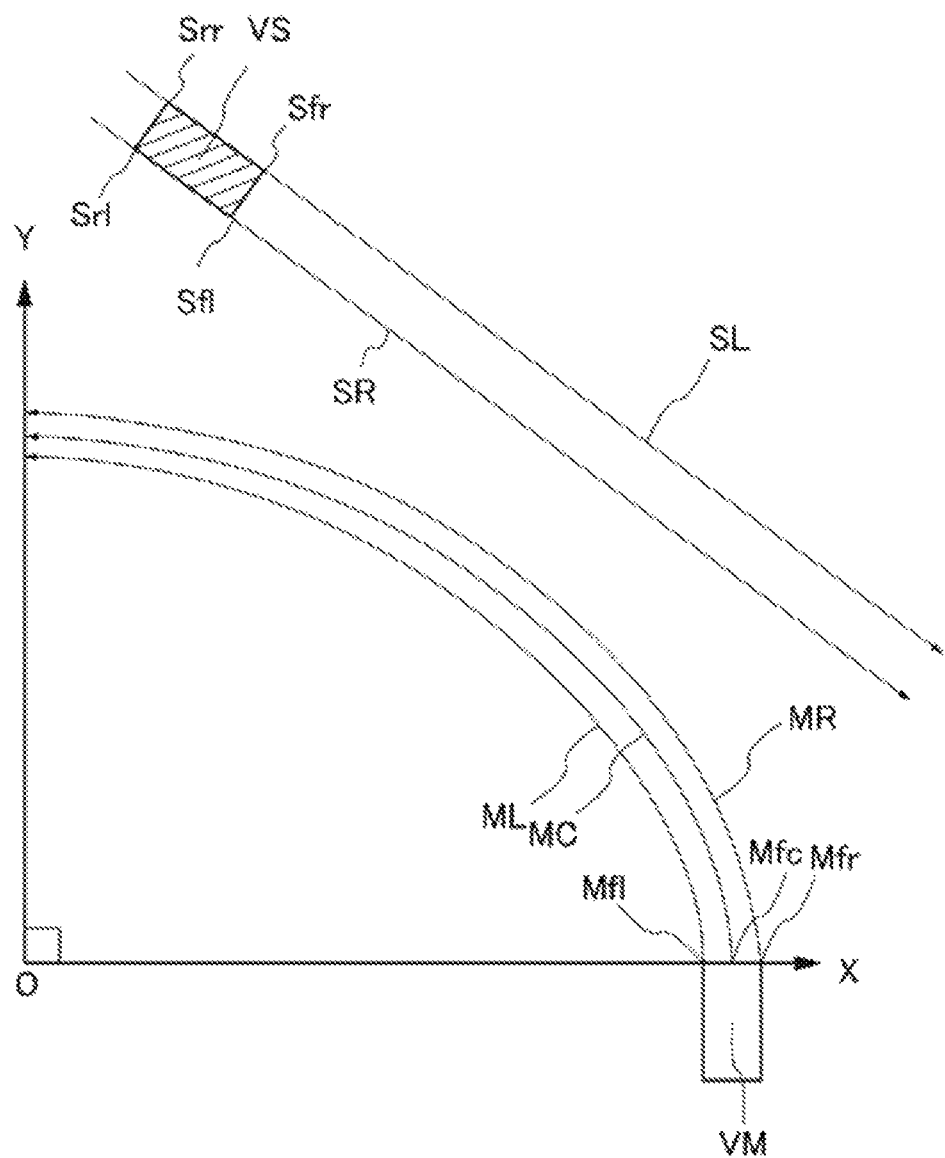
FIG. 8 is a diagram illustrating own vehicle predicted paths and target vehicle predicted paths that do not intersect each other until a prediction end time.
Figure 9:
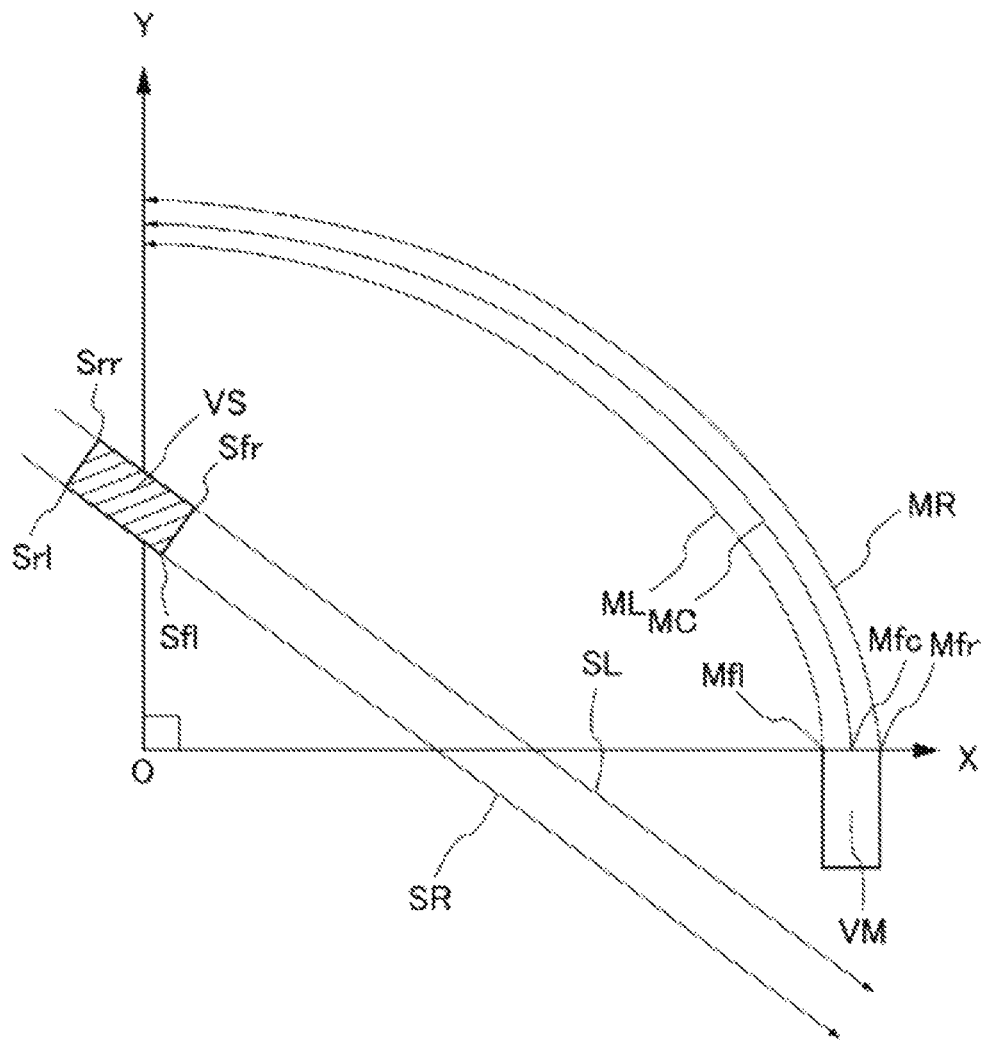
FIG. 9 is a diagram illustrating the own vehicle predicted paths and the target vehicle predicted paths that do not intersect each other until the prediction end time.

In step S33, when there is no intersection point i, the ECU 11 may set a time when the vehicle VM turns by 90° as the provisional contact time Tt. For example, in cases of FIGS. 8 and 9, the predicted paths of the vehicle VM and the straight lines of the target vehicle VS have no intersection point i. When there is no intersection point i as illustrated in FIGS. 8 and 9, the time when the vehicle VM turns by 90°, i.e., the upper limit of the prediction angle range, and moves to the vehicle VMt may be set as the provisional contact time Tt. In the above manner, a first stage of the contact determination process may end.

Figure 10:
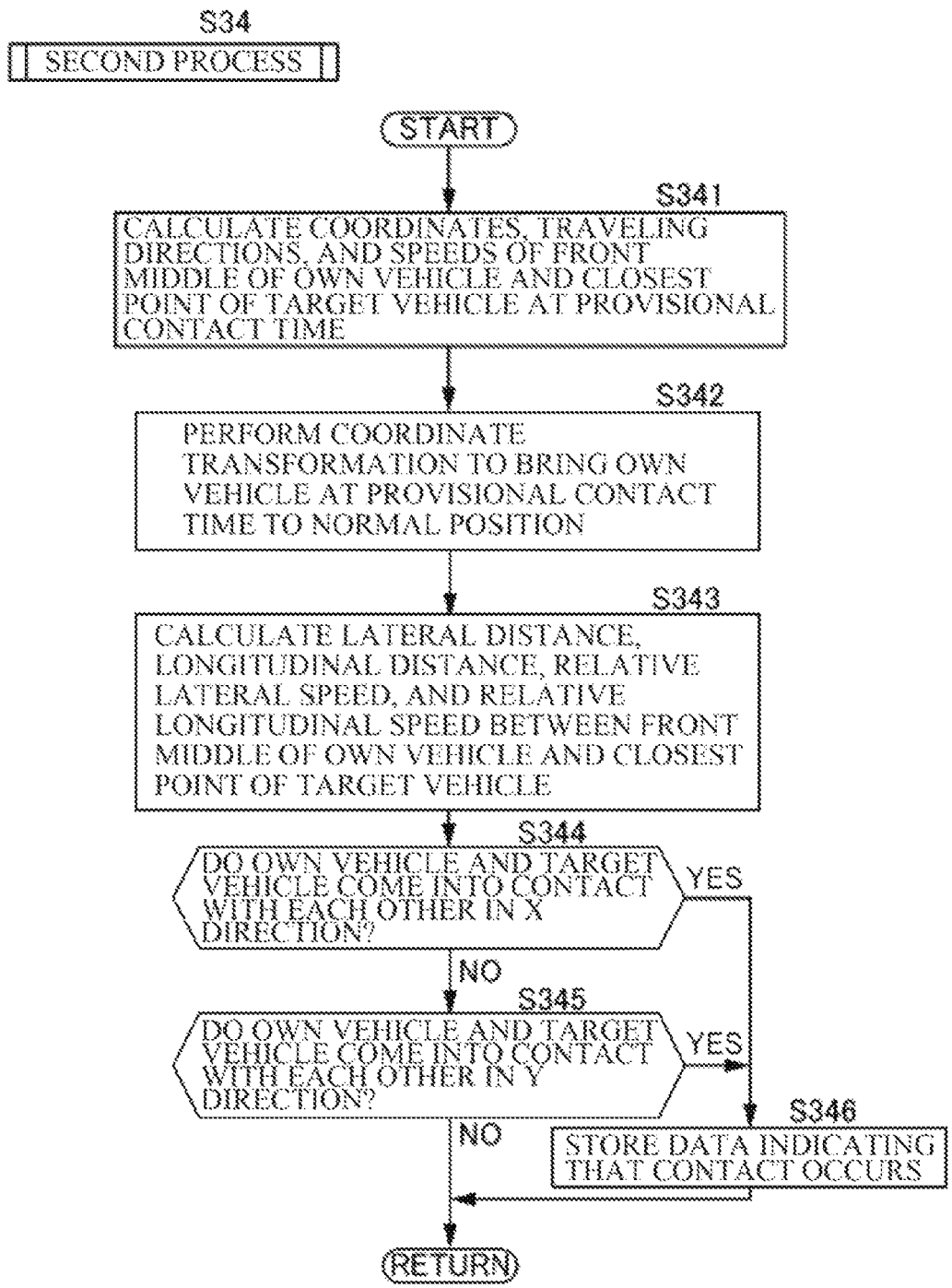
FIG. 10 is a flowchart illustrating a second process.

As illustrated in FIG. 4, when step S33 ends, the ECU 11 may perform the second process in step S34. The second process may be a process in a second stage of the contact determination process. In the second process, the ECU 11 determines whether the vehicle VM and the target vehicle VS come into contact with each other, assuming that the vehicle VMt and the target vehicle VSt at the provisional contact time Tt travel straight to cross each other. The second process in step S34 is illustrated in FIG. 10. In the second process, the ECU 11 may perform coordinate transformation to bring the vehicle VM at the provisional contact time Tt to a normal position, and thereafter perform contact determination by using a lateral distance Dx and a relative lateral speed Vx, and a longitudinal distance Dy and a relative longitudinal speed Vy.

In step S341, the ECU 11 may calculate the coordinates of the front middle Mfc of the vehicle VMt at the provisional contact time Tt indicated by the dotted line in FIG. 2. In addition, the ECU 11 may calculate a closest point Sc, of the target vehicle VSt, closest to the front middle Mfc of the vehicle VMt at the provisional contact time Tt illustrated in FIG. 2. In the case of FIG. 2, the front right end Sfr of the target vehicle VSt is the closest point Sc. The ECU 11 may obtain the coordinates, the traveling direction, and the speed of the front middle Mfc of the vehicle VMt, and the coordinates, the traveling direction, and the speed of the closest point Sc, i.e., the front right end Sfr of the target vehicle VSt. It is assumed that the vehicle VM and the target vehicle VS are unchanged in speed from the prediction reference time Ts, and that the target vehicle VS is also unchanged in traveling direction from the prediction reference time Ts. Accordingly, used as the speed of the front middle Mfc of the vehicle VMt and the traveling direction and the speed of the front right end Sfr of the target vehicle VSt may be those at the prediction reference time Ts. The traveling direction of the vehicle VMt may be obtained based on a time period from the prediction reference time Ts to the provisional contact time Tt, and the yaw rate change rate Yrc.

Figure 11:
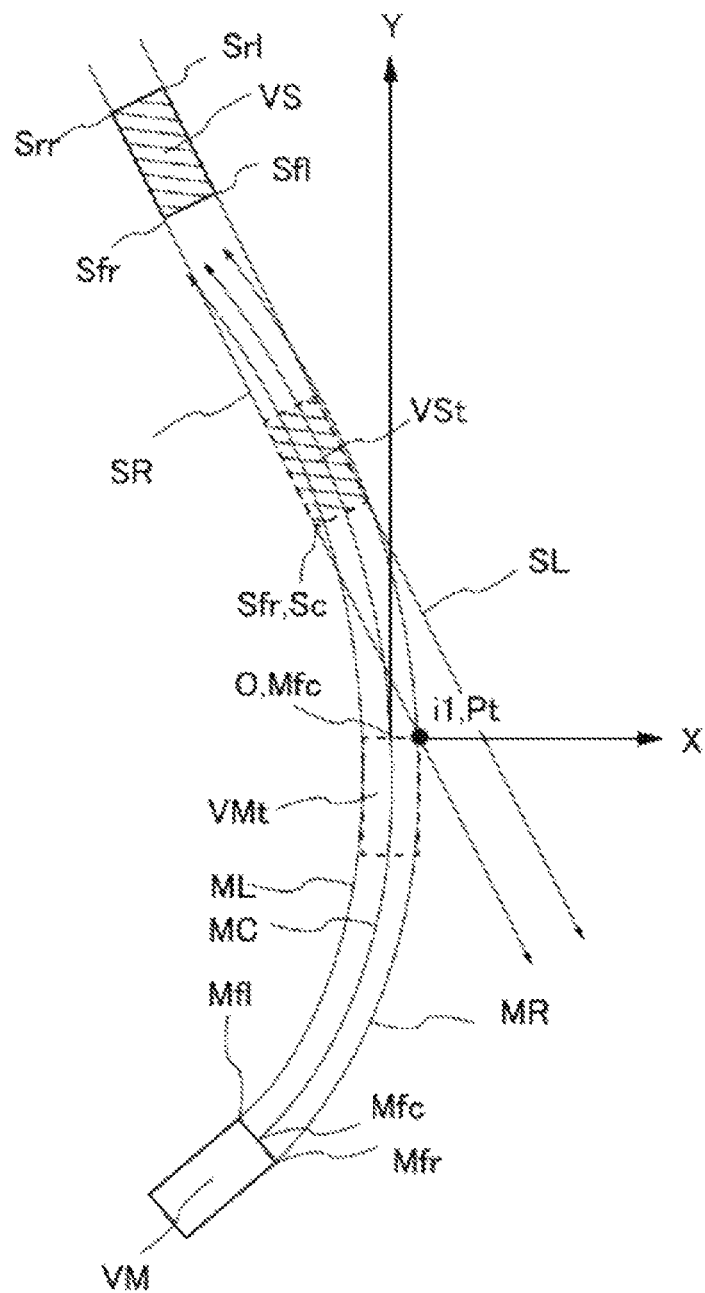
FIG. 11 is a diagram illustrating the predicted paths after coordinate transformation.

In step S342, the ECU 11 may perform coordinate transformation on the calculated coordinates and traveling direction of the front middle Mfc of the vehicle VMt, and the calculated coordinates and traveling direction of the front right end Sfr serving as the closest point Sc of the target vehicle VSt. In the coordinate transformation, the ECU 11 may perform rotation and movement to bring the vehicle VMt to the normal position where the vehicle VMt at the provisional contact time Tt has a front direction facing the +Y direction and the front middle Mfc is at an origin O. The ECU 11 may also perform the coordinate transformation on the rectangle of the vehicle VMt and the rectangle of the target vehicle VSt. FIG. 11 illustrates the position of, for example, the vehicle VMt after the end of the coordinate transformation. The vehicle VMt is at the normal position where the front middle Mfc of the vehicle VMt is positioned at the origin O and the vehicle VMt faces the +Y direction.

Figure 12:
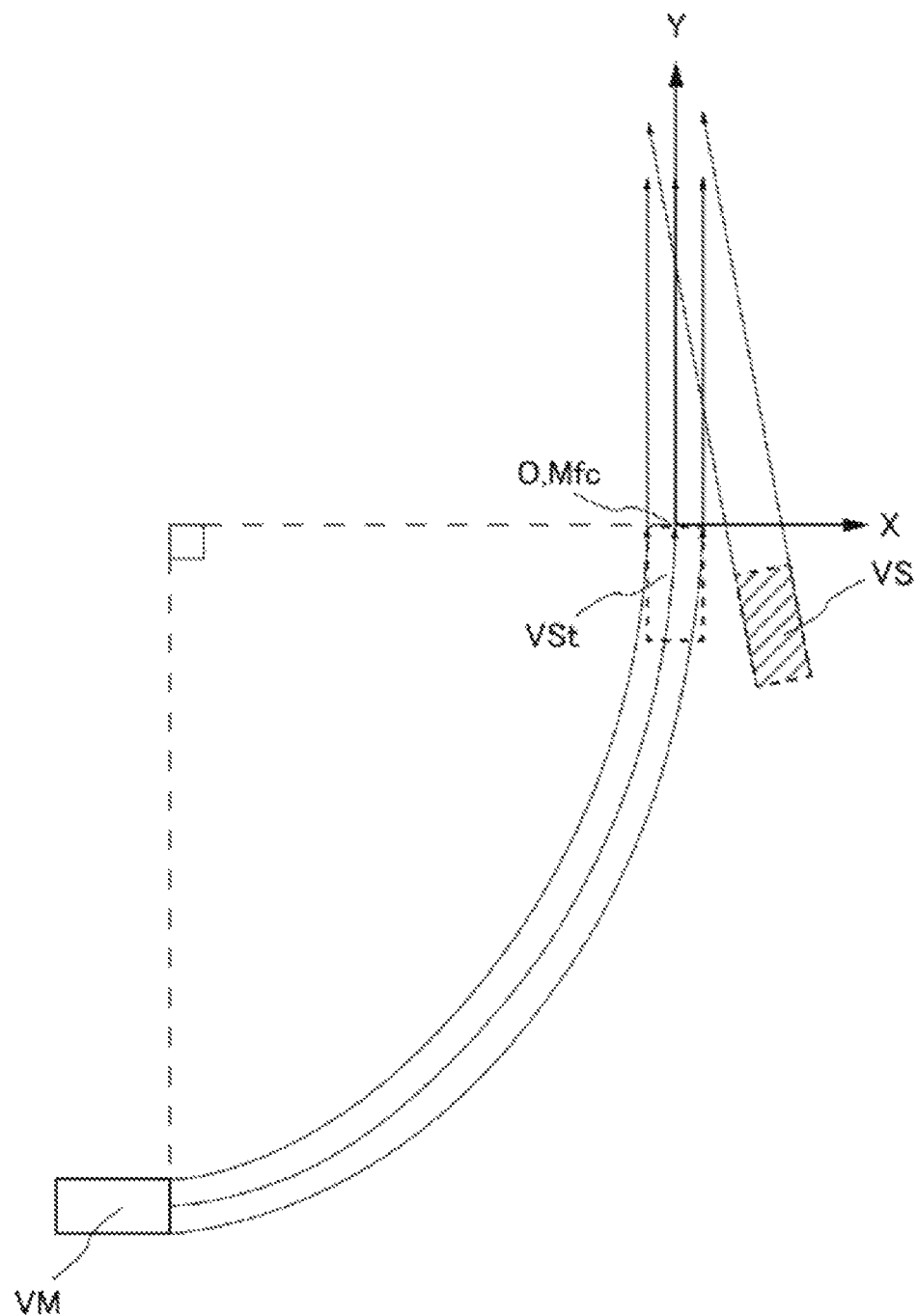
FIG. 12 is a diagram illustrating the predicted paths after coordinate transformation when there is no intersection point.

FIG. 11 illustrates an example in which there are the intersection points i as the candidates for the provisional contact point Pt. FIG. 12 illustrates an example after the coordinate transformation at the provisional contact time Tt in a case where there is no intersection point i. This corresponds to a case where, in step S33, the ECU 11 determines that there is no intersection point, and sets the time when the vehicle VM turns by 90°, i.e., the upper limit of the prediction angle range, as the provisional contact time Tt. Accordingly, in step S342, the coordinate transformation including movement and rotation by 90° may be performed. FIG. 12 illustrates, for example, the vehicle VMt and the target vehicle VSt, the own vehicle predicted path, and the target vehicle predicted path after the coordinate transformation including movement and rotation by 90°.

Figure 13:
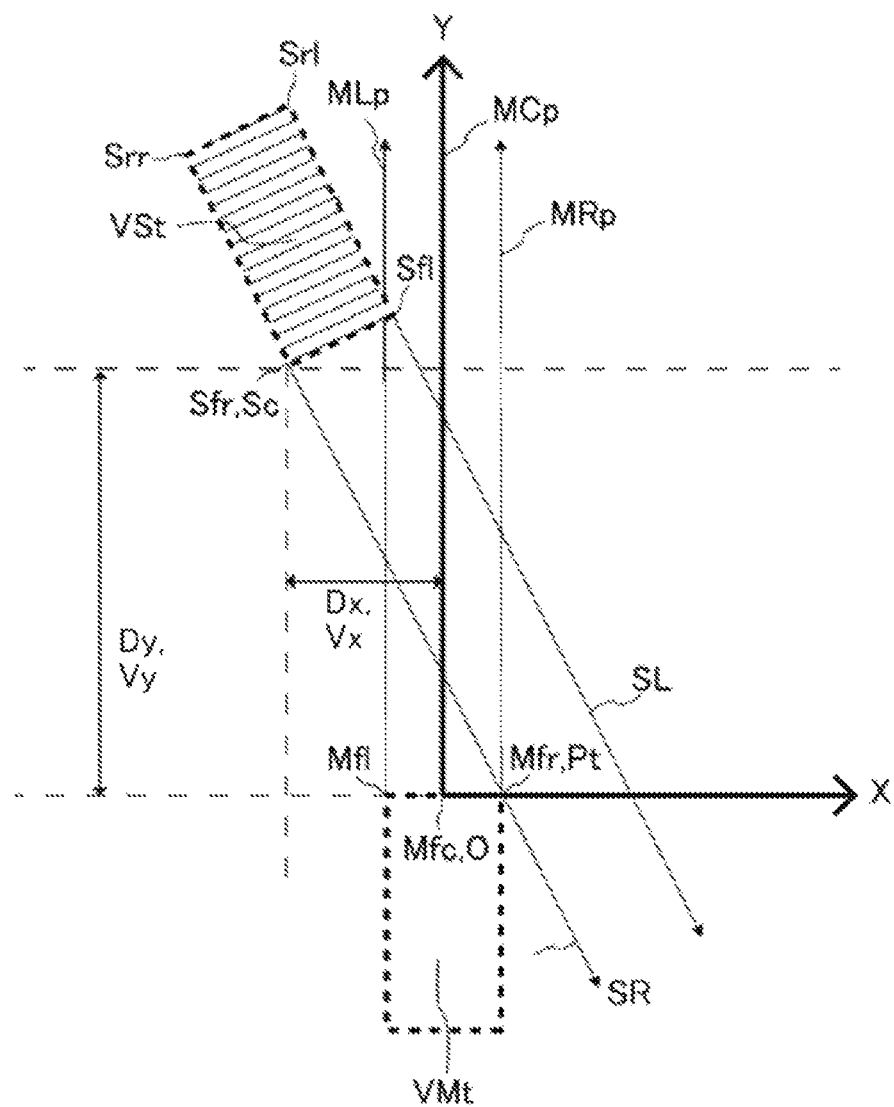
FIG. 13 is a diagram illustrating contact determination based on straight traveling and crossing after coordinate transformation.

In subsequent step S343, the ECU 11 may calculate the lateral distance Dx, the longitudinal distance Dy, the relative lateral speed Vx, and the relative longitudinal speed Vy between the vehicle VMt and the target vehicle VSt. FIG. 13 is an enlarged view of the vicinity of the vehicle VMt after the coordinate transformation. FIG. 13 illustrates straight lines indicating an own vehicle right predicted path MRp, an own vehicle middle predicted path MCp, an own vehicle left predicted path MLp, the target vehicle right predicted path SR, and the target vehicle left predicted path SL, assuming that the vehicle VMt and the target vehicle VSt at the provisional contact time Tt travel straight. On the XY coordinates in FIG. 13, the front middle Mfc of the vehicle VMt is positioned at the origin O, the front of the vehicle VMt faces the +Y direction, and the own vehicle middle predicted path MCp extending straight overlaps with a Y-axis.

The lateral distance Dx, the longitudinal distance Dy, the relative lateral speed Vx, and the relative longitudinal speed Vy illustrated in FIG. 13 may be obtained between the front middle Mfc of the vehicle VMt and the closest point Sc of the target vehicle VSt at the provisional contact time Tt. The lateral distance Dx and the longitudinal distance Dy may respectively be the absolute value of the X coordinate and the absolute value of the Y coordinate of the closest point Sc in FIG. 13. The vehicle VMt after the coordinate transformation does not move in an X direction, and the speed of the closest point Sc of the target vehicle VSt in the X direction may thus be the relative lateral speed Vx. In addition, the ECU 11 may calculate the relative longitudinal speed Vy by subtracting the speed of the closest point Sc of the target vehicle VSt from the speed of the front middle Mfc of the vehicle VMt in a Y direction. Regarding the relative speed in the Y direction, the speed of the vehicle VM at the prediction reference time Ts may be assumed to be unchanged, and the speed of the vehicle VMt in the Y direction at the provisional contact time Tt may be used.

In subsequent step S344, the ECU 11 may determine whether the target vehicle VS comes into contact with the vehicle VM, regarding the X direction. The ECU 11 may obtain an X direction time-to-contact Tx based on an expression (1).

$$X \text{ direction time-to-contact } Tx = \text{lateral distance } Dx/\text{relative lateral speed } Vx \quad (1)$$

Thereafter, the ECU 11 may calculate the own vehicle rectangle of the vehicle VM and the target vehicle rectangle of the target vehicle VS after elapse of the X direction time-to-contact Tx from the provisional contact time Tt. When the own vehicle rectangle and the target vehicle rectangle are in contact with or overlap with each other, the ECU 11 may determine that contact occurs. If the ECU 11 determines that contact occurs (YES in step S344), the ECU 11 may cause the flow to proceed to step S346. If the ECU 11 determines that no contact occurs (NO in step S344), the ECU 11 may cause the flow to proceed to step S345.

In step S345, the ECU 11 may determine whether the target vehicle VS comes into contact with the vehicle VM, regarding the Y direction. The ECU 11 may obtain a Y direction time-to-contact Ty based on an expression (2).

$$Y \text{ direction time-to-contact } Ty = \text{longitudinal distance } Dy/\text{relative longitudinal speed } Vy \quad (2)$$

Thereafter, the ECU 11 may calculate the own vehicle rectangle of the vehicle VM and the target vehicle rectangle of the target vehicle VS after elapse of the Y direction time-to-contact Ty from the provisional contact time Tt. When the own vehicle rectangle and the target vehicle rectangle are in contact with or overlap with each other, the ECU 11 may determine that contact occurs. If the ECU 11 determines that contact occurs (YES in step S345), the ECU 11 may cause the flow to proceed to step S346. If the ECU 11 determines that no contact occurs (NO in step S345), the ECU 11 may end the second process in step S34 and return to the main routine.

Figure 14:
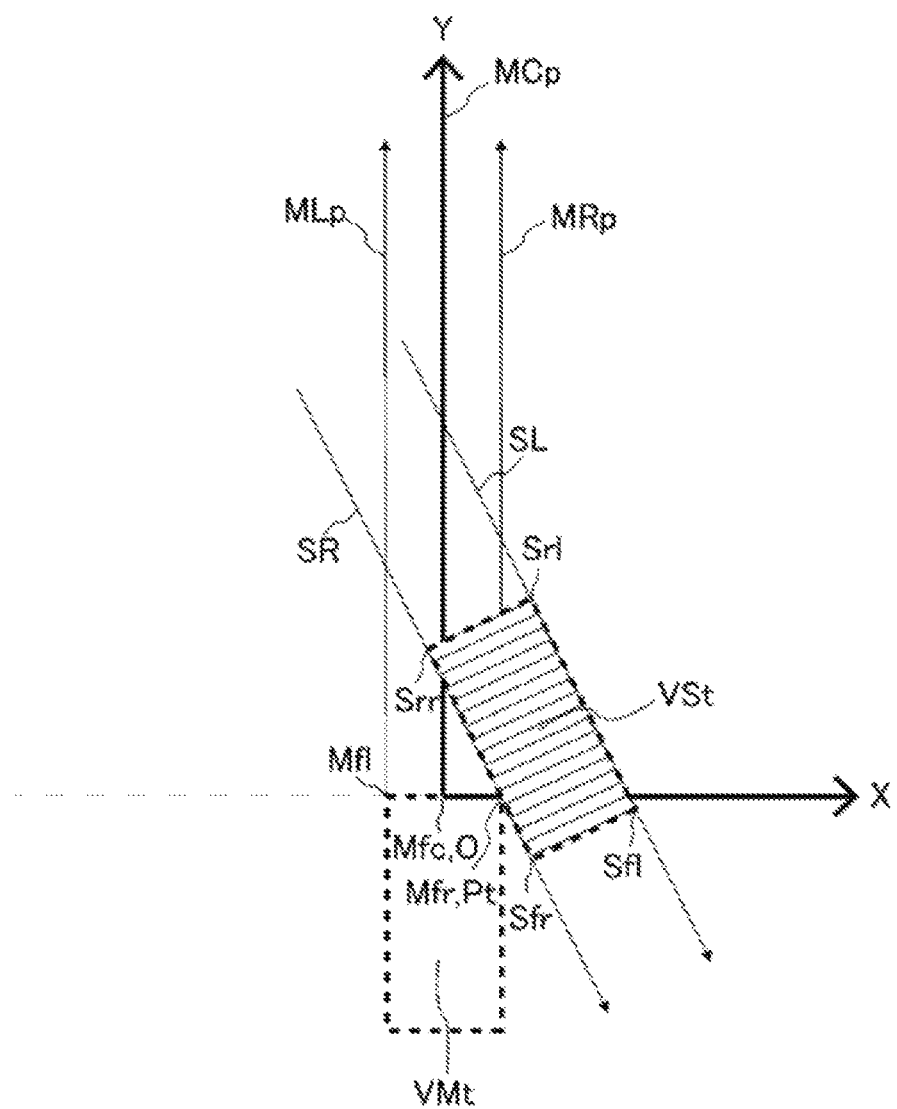
FIG. 14 is a diagram illustrating a case where the target vehicle is in contact with the vehicle at a provisional contact time.
Figure 15:
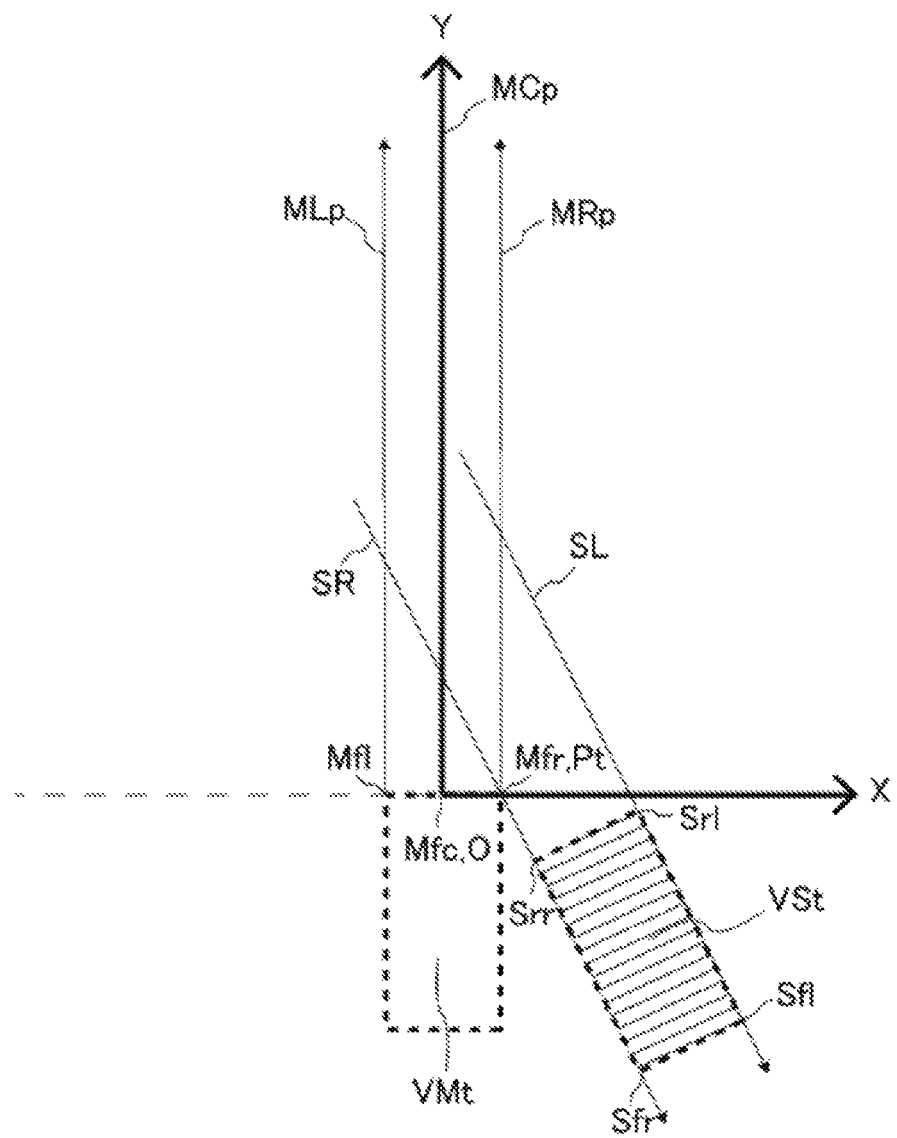
FIG. 15 is a diagram illustrating a case where the target vehicle has traveled past a traveling range of the vehicle at the provisional contact time.

Note that, when the target vehicle VSt is in contact with the vehicle VMt as in FIG. 14 at the provisional contact time Tt, the ECU 11 may determine that contact occurs (YES). In contrast, when the target vehicle VS has traveled past a traveling range of the vehicle VM as in FIG. 15 at the provisional contact time Tt, the ECU 11 may determine that no contact occurs (NO). In FIG. 15, the target vehicle VSt travels to a positive side in the X direction, though the target vehicle VS (not illustrated) is on a negative side in the X direction at the prediction reference time Ts. At the provisional contact time Tt, all the X coordinates of the target vehicle VSt are larger than the own vehicle right predicted path MRp that is the own vehicle predicted path of the vehicle VMt on the positive side in the X direction. It may thus be determined that the target vehicle VS has traveled past the traveling range of the vehicle VM.

In step S346, the ECU 11 may store data indicating that contact occurs, thereafter end the second process in step S34, and return to the main routine. When the second process in step S34 ends, the contact determination process in step S3 may end as illustrated in FIG. 4, and the ECU 11 may return to the main routine in FIG. 3.

In FIG. 3, when the contact determination process in step S3 ends, the ECU 11 may determine in step S4 whether a determined emergency level of the contact indicated by the stored data is high. If data indicating that contact occurs is not held or the ECU 11 determines that the emergency level is not high (NO in step S4), the ECU 11 may end the process. For example, when there is a margin of greater than or equal to a predetermined time period before a time of contact obtained based on, for example, the X direction time-to-contact Tx or the Y direction time-to-contact Ty, it may be determined that the emergency level is not high. In other cases, i.e., if the ECU 11 determines that the determined emergency level of the contact indicated by the stored data is high (YES in step S4), the ECU 11 may end the process after performing the contact response operation such as automatic braking in step S5. Upon activation of the automatic braking, the ECU 11 may transmit a braking signal to the braking device 2 via the communication line 3 to apply a brake to the vehicle VM, making it possible to avoid the contact with the target vehicle VS.

In the example embodiment, as described above, the ECU 11 calculates the yaw rate change rate Yrc based on the yaw rate Yr of the vehicle VM obtained at the multiple time points t. The ECU 11 calculates the target vehicle predicted path that is the predicted path of the target vehicle VS, and calculates the own vehicle predicted path that is the predicted path of the vehicle VM assuming that the yaw rate change rate Yrc is kept constant. The ECU 11 calculates the provisional contact point Pt based on the intersection point of the own vehicle predicted path and the target vehicle predicted path, and calculates the provisional contact time Tt when the vehicle VM reaches the provisional contact point Pt. In the subsequent stage, the ECU 11 determines whether the vehicle VM and the target vehicle VS come into contact with each other, assuming that the vehicle VM and the target vehicle VS at the provisional contact time Tt travel straight to cross each other.

In this manner, in the first stage, the ECU 11 calculates the own vehicle predicted path based on the yaw rate change rate Yrc of the vehicle VM, calculates the provisional contact point Pt, and calculates the provisional contact time Tt. In the second stage, the ECU 11 performs contact determination assuming that the vehicle VM and the target vehicle VS travel straight after the provisional contact time Tt. Thus, it is possible to perform contact determination with a small amount of calculation, making it possible to suppress a processing load on the CPU 111.

In the example embodiments, the prediction angle range may be from 0° to 90° both inclusive, and the time when the vehicle VM turns by 90° may be the prediction end time. In some embodiments, another angle range may be used as the prediction angle range. For example, the prediction angle range may be from 0° to 120° both inclusive or from 0° to 60° both inclusive, and a time when the vehicle VM turns by 120° or 60° may be set as the prediction end time. In addition, in the example embodiments, the intersection points i serving as the candidates for the provisional contact point Pt may be calculated by using, as the own vehicle predicted path, three own vehicle predicted paths of the own vehicle right predicted path MR, the own vehicle middle predicted path MC, and the own vehicle left predicted path ML. Although accuracy of the determination decreases slightly, two own vehicle predicted paths excluding the own vehicle middle predicted path MC may be used, or the own vehicle middle predicted path MC may be used.

In the example embodiments, the provisional contact time Tt may be calculated by using the own vehicle right predicted path MR, the own vehicle middle predicted path MC, and the own vehicle left predicted path ML. In some embodiments, the provisional contact time Tt may be calculated by using the own vehicle right predicted path MR and the own vehicle left predicted path ML, without using the own vehicle middle predicted path MC. In addition, in the example embodiments, the own vehicle predicted path may be the predicted path of each part of the front of the vehicle VM. In some embodiments, the predicted path of a portion other than the front may be used as the own vehicle predicted path, or the own vehicle predicted path may be used without determining a specific portion.

In the example embodiments, the provisional contact point Pt may be calculated assuming that the target vehicle VS travels in a uniform linear motion, and the provisional contact time Tt may be calculated. In some embodiments, in a case where the target vehicle VS is also traveling along a curve, a degree of the curve may be calculated based on, for example, camera images, the provisional contact point may be calculated assuming a predicted path indicated by a circle having a predetermined radius, and the provisional contact time may be calculated.

In addition, in the example embodiments, in the second process in the second stage after the provisional contact time Tt, the lateral distance Dx, the relative lateral speed Vx, the longitudinal distance Dy, and the relative longitudinal speed Vy may be calculated regarding the closest point Sc, i.e., a portion of the target vehicle VS that is closest to the front middle Mfc of the vehicle VM. Contact determination may be performed based on whether the target vehicle VS is in contact with or overlaps with the vehicle VM after elapse of the X direction time-to-contact Tx obtained from the lateral distance Dx and the relative lateral speed Vx, or the Y direction time-to-contact Ty obtained from the longitudinal distance Dy and the relative longitudinal speed Vy. In some embodiments, another contact determination process between straight traveling vehicles may be used for the determination in the second stage.

In addition, in the example embodiments, the position, etc. of the target vehicle VS may be detected based on data obtained from the cameras 12 and the radar sensors 13. In some embodiments, the position, etc. of the target vehicle VS may be detected based on data obtained from either the cameras 12 or the radar sensors 13. The position, etc. of the target vehicle VS may be detected based on data obtained from all or a portion of the cameras 12, the radar sensors 13, and other devices.

In the example embodiments, for example, the cameras 12 and the radar sensors 13 may be used. Any of various sensors may be used as long as the sensor is configured to detect a relative relationship, including a relative position and a relative speed, with respect to the target vehicle VS.

Although some example embodiments of the disclosure have been described in the foregoing by way of example with reference to the accompanying drawings, the disclosure is by no means limited to the embodiments described above.

It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to at least one embodiment of the disclosure, it possible to, in driving assistance assuming that an own vehicle is traveling along a clothoid curve, predict a contact position or determine whether contact occurs between the own vehicle and a target vehicle.

As used herein, the term "collision" may be used interchangeably with the term "contact".

The ECU 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 11 illustrated in FIG. 1.

The invention claimed is:

1. A driving assistance apparatus comprising an electronic control unit configured to:
    perform a provisional collision point extraction process including:
        calculating a yaw rate change rate of a first vehicle to which the driving assistance apparatus is to be applied, based on a yaw rate of the first vehicle obtained at multiple time points;
        calculating a predicted path of a second vehicle;
        calculating a predicted path of the first vehicle assuming that the yaw rate change rate is kept constant;
        calculating a provisional contact point, based on an intersection point of the predicted path of the first vehicle and the predicted path of the second vehicle; and
        calculating a provisional contact time at which the first vehicle reaches the provisional contact point; and
    perform a straight-line intersection evaluation process including:
        assuming that the first vehicle and the second vehicle travel straight from the provisional contact time; and
        determining whether the first vehicle and the second vehicle come into contact with each other; and
    transmitting a braking signal to a braking device of the first vehicle in response to determining that the first vehicle and the second vehicle come into contact with each other.

2. The driving assistance apparatus according to claim 1, wherein the electronic control unit is configured to obtain the yaw rate change rate, based on the yaw rate obtained at two time points.

3. The driving assistance apparatus according to claim 2, wherein the electronic control unit is configured to represent the first vehicle as a rectangle on a horizontal plane, and represent the second vehicle as a rectangle on the horizontal plane.

4. The driving assistance apparatus according to claim 2, wherein the electronic control unit is configured to calculate the predicted path of the second vehicle by assuming that the second vehicle travels in a uniform linear motion.

5. The driving assistance apparatus according to claim 1, wherein the electronic control unit is configured to obtain the yaw rate change rate by a least squares method, based on the yaw rate obtained at three or more time points.

6. The driving assistance apparatus according to claim 5, wherein the electronic control unit is configured to represent the first vehicle as a rectangle on a horizontal plane, and represent the second vehicle as a rectangle on the horizontal plane.

7. The driving assistance apparatus according to claim 5, wherein the electronic control unit is configured to calculate the predicted path of the second vehicle by assuming that the second vehicle travels in a uniform linear motion.

8. The driving assistance apparatus according to claim 1, wherein the electronic control unit is configured to represent the first vehicle as a rectangle on a horizontal plane, and represent the second vehicle as a rectangle on the horizontal plane.

9. The driving assistance apparatus according to claim 1, wherein the electronic control unit is configured to calculate the predicted path of the second vehicle by assuming that the second vehicle travels in a uniform linear motion.

10. A driving assistance method comprising:
performing a provisional collision point extraction process including:
calculating a yaw rate change rate of a first vehicle to which the driving assistance method is to be applied, based on a yaw rate of the first vehicle obtained at multiple time points;
calculating a predicted path of a second vehicle;
calculating a predicted path of the first vehicle assuming that the yaw rate change rate is kept constant;
calculating a provisional contact point, based on an intersection point of the predicted path of the first vehicle and the predicted path of the second vehicle; and
calculating a provisional contact time at which the first vehicle reaches the provisional contact point;
performing a straight-line intersection evaluation process including:
assuming that the first vehicle and the second vehicle travel straight from the provisional contact time; and
determining whether the first vehicle and the second vehicle come into contact with each other; and
transmitting a braking signal to a braking device of the first vehicle in response to determining that the first vehicle and the second vehicle come into contact with each other.

11. A non-transitory computer readable recording medium containing a program, the program causing, when executed by a computer, the computer to implement a method, the method comprising:
performing a provisional collision point extraction process including:
calculating a yaw rate change rate of a first vehicle to which the method is to be applied, based on a yaw rate of the first vehicle obtained at multiple time points;
calculating a predicted path of a second vehicle;
calculating a predicted path of the first vehicle assuming that the yaw rate change rate is kept constant;
calculating a provisional contact point, based on an intersection point of the predicted path of the first vehicle and the predicted path of the second vehicle; and
calculating a provisional contact time at which the first vehicle reaches the provisional contact point;
performing a straight-line intersection evaluation process including:
assuming that the first vehicle and the second vehicle travel straight from the provisional contact time; and
determining whether the first vehicle and the second vehicle come into contact with each other; and
transmitting a braking signal to a braking device of the first vehicle in response to determining that the first vehicle and the second vehicle come into contact with each other.

12. A driving assistance apparatus for a first vehicle, the driving assistance apparatus comprising:
a memory; and
a processor coupled to the memory, the processor configured to:
calculate a yaw rate of the first vehicle using at least one of a speed, a lateral acceleration rate, and a steering wheel rotation angle detected from sensors installed in the first vehicle, and
in response to detecting that the first vehicle turns at the yaw rate continuously more than or equal to a threshold for a certain period, the processor is configured to execute a collision prediction process between the first vehicle and a second vehicle detected in front of the first vehicle, wherein
the processor is configured to, in the collision prediction process,
calculate a yaw rate change rate of the first vehicle to which the driving assistance apparatus is to be applied, based on the yaw rate of the first vehicle obtained at multiple time points;
calculate a first predicted path until the first vehicle traveling in a curve turns by 90 degrees using the change rate;
calculate a second predicted path of the second vehicle traveling in a straight line;
calculate a provisional contact point where the first predicted path and the second predicted path intersect;
calculate a provisional contact time when the first vehicle reaches the provisional contact point; and
determine that the first vehicle and the second vehicle come into contact with each other when detecting that the provisional contact time is less or equal to a predetermined time, and at least activate an automatic braking by transmitting a braking signal to a braking device of the first vehicle.

* * * * *